(12) United States Patent
Schafrik et al.

(10) Patent No.: US 6,499,949 B2
(45) Date of Patent: Dec. 31, 2002

(54) TURBINE AIRFOIL TRAILING EDGE WITH MICRO COOLING CHANNELS

(76) Inventors: Robert Edward Schafrik, 9918 Pheasant Walk Ct., Cincinnati, OH (US) 45241; Ramgopal Darolia, 7377 Overland Park Ct., West Chester, OH (US) 45069; Ching-Pang Lee, 12 Camargo Pines La., Cincinnati, OH (US) 45243

( * ) Notice: Subject to any disclaimer, the term of this patent is extended or adjusted under 35 U.S.C. 154(b) by 46 days.

(21) Appl. No.: 09/818,385

(22) Filed: Mar. 27, 2001

(65) Prior Publication Data
US 2002/0141870 A1 Oct. 3, 2002

(51) Int. Cl.$^7$ ................................................. F01D 5/18
(52) U.S. Cl. ................................ 416/97 R; 416/241 R; 29/889.2
(58) Field of Search .......................... 416/97 A, 241 R, 416/92, 97 R, 241 B; 29/889, 889.2

(56) References Cited

U.S. PATENT DOCUMENTS 6,408,610 B1 * 6/2002 Caldwell et al. ............ 29/889.2

* cited by examiner

Primary Examiner—Edward K. Look
Assistant Examiner—Kimya N McCoy

(74) Attorney, Agent, or Firm—Carmen Santa Maria; McNees Wallace & Nurick LLC

(57) ABSTRACT

The present invention provides active convection cooling through micro channels within or adjacent to a bond coat layer applied to the trailing edge of a turbine engine high pressure airfoil. When placed adjacent to or within a porous TBC, the micro channels additionally provide transpiration cooling through the porous TBC. The micro channels communicate directly with at least one cooling circuit contained within the airfoil from which they receive cooling air, thereby providing direct and efficient cooling for the bond coat layer. Because the substrate includes an actively cooled flow path surface region that can reduce the cooling requirement for the substrate, the engine can run at a higher firing temperature without the need for additional cooling air, achieving a better, more efficient engine performance. In one embodiment, a metallic bond coat is added to an airfoil with pressure side bleed film cooling slots. The bond coat is grooved such that the grooves are structured, with at least one structured micro groove communicating with at least one cooling fluid supply contained within the airfoil. A TBC layer is applied, using a shadowing technique, over the structured grooves, resulting in the formation of hollow micro channels for the transport of the cooling fluid. In different embodiments, the location of the structured grooves, hence, the resulting micro channels are placed within the airfoil substrate at the substrate/bond coat interface or within the TBC layer.

24 Claims, 4 Drawing Sheets

TURBINE AIRFOIL TRAILING EDGE WITH MICRO COOLING CHANNELS

FIELD OF THE INVENTION

This invention relates generally to gas turbine engines, and in particular, to a cooled flow path surface region on a turbine airfoil trailing edge.

CROSS-REFERENCE TO RELATED APPLICATIONS

This application references co-pending applications assigned to the assignee of the present invention, which are identified as Ser. No. 09/707,024 entitled "Transpiration Cooling in Thermal Barrier Coating,"; U.S. patent application Ser. No. 09/707,027 filed Nov. 6, 2000, now U.S. Pat. No. 6,375,425 issued Apr. 23, 2002; entitled "Multi-layer Thermal Barrier Coating with Integrated Cooling System,"; now U.S. application Ser. No. 09/707,024 filed Nov. 6, 2000; entitled "Directly Cooled Thermal Barrier Coating System" now U.S. application Ser. No. 09/707,023 filed Nov. 6, 2002, entitled "Method For Creating Structured Porosity In Thermal Barrier Coating," now U.S. application Ser. No. 09/777,430 filed Feb. 6, 2001, the contents of which are incorporated herein by reference.

BACKGROUND OF THE INVENTION

In gas turbine engines, for example, aircraft engines, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine which are in contact with these gases. Operation of these engines at gas temperatures that are above the metal part melting temperatures is a well established art, and depends in part on supplying a cooling fluid to the outer surfaces of the metal parts through various methods. Metal parts of these engines that are particularly subject to high temperatures, and thus require particular attention with respect to cooling, are, for example, the metal parts located aft of the combustor including high pressure turbine airfoils, such as exhaust nozzles and blades.

The hotter the turbine inlet gases, the more efficient is the operation of the jet engine. There is thus an incentive to raise the turbine inlet gas temperature. However, the maximum temperature of the turbine inlet gases is normally limited by the materials used to fabricate the components downstream of the combustors such as the vanes and the blades of the turbine. In current engines, the turbine vanes and blades are made of nickel-based superalloys, and can operate at temperatures of up to 2100°–2200° F.

The metal temperatures can be maintained below melting levels with current cooling techniques by using a combination of improved active cooling designs and thermal barrier coatings (TBCs). For example, with regard to the metal blades and vanes employed in aircraft engines, some cooling is achieved through convection by providing passages for flow of cooling air from the compressor internally within the blades so that heat may be removed from the metal structure of the blade by the cooling air. Such blades have intricate serpentine passageways within the structural metal forming the cooling circuits of the blade.

Small internal orifices have also been devised to direct this circulating cooling air directly against certain inner surfaces of the airfoil to obtain cooling of the inner surface by impingement of the cooling air against the surface, a process known as impingement cooling. In addition, an array of small holes extending from a hollow core through the blade shell can provide for bleeding cooling air through the blade shell to the outer surface where a film of such air can protect the blade from direct contact with the hot gases passing through the engines, a process known as film cooling.

In another approach, a thermal barrier coating (TBC) is applied to the turbine blade component, which forms an interface between the metallic component and the hot gases of combustion. The TBC includes a ceramic coating that is applied to the external surface of metal parts to impede the transfer of heat from hot combustion gases to the metal parts, thus insulating the component from the hot combustion gas. This permits the combustion gas to be hotter than would otherwise be possible with the particular material and fabrication process of the component.

TBCs include well-known ceramic materials, for example, yttrium-stabilized zirconia (YSZ). Ceramic TBCs usually do not adhere well directly to the superalloys used as substrate materials. Therefore, an additional metallic layer, a bond coat, is placed between the substrate and the TBC. The bond coat may be made of a nickel-containing overlay alloy, such as a MCrAlX, or other composition more resistant to environmental damage than the substrate, or alternatively, the bond coat may be a diffusion nickel aluminide or platinum aluminide whose surface oxidizes to form a protective aluminum oxide scale that provides improved adherence to the ceramic top coatings. The bond coat and overlying ceramic TBC are frequently referred to as a thermal barrier coating system.

Improved environmental resistance to destructive oxidation and hot corrosion is desirable. In addition, the alloying elements of the bond coat interdiffuse with the substrate alloy, changing the composition of the protective outer layer so that the walls of the turbine airfoils are consumed. This loss of material reduces the load carrying capability of the airfoil, thereby limiting blade life. This interdiffusion can also reduce environmental resistance of the coating. This interdiffusion and its adverse effects can be reduced by controlling the temperature of the component in the region of the bond coat/substrate interface.

In previous designs, the bond coat temperature limit has been critical to the TBC's life and has had an upper limit of about 2100° F. Once the bond coat exceeds this temperature, the thermal barrier coating system will quickly deteriorate, due to high temperature mechanical deformation and accelerated oxidation as well as a more rapid interdiffusion of elements between the bond coat and the underlying substrate alloy. The thermal barrier coating system can separate from the substrate exposing the underlying superalloy component to damage from the hot gasses.

Even with the use of advanced cooling designs and thermal barrier coatings, it is also desirable to decrease the requirement for cooling air, because reducing the demand for cooling air also contributes to improving overall engine operating efficiency. One way to achieve such a reduction is to improve the cooling of the metal parts immediately adjacent to their outer surfaces, which typically are exposed to the highest gas temperatures.

The trailing edge of high-pressure turbine airfoils, including nozzles and blades, typically require active cooling. Two types of trailing edge cooling are commonly used in current practice. The first type uses centerline convection cooling holes. This design requires a thicker trailing edge and, therefore, has more trailing edge blockage and lower aerodynamic efficiency, but has better cooling efficiency. The second type uses pressure side bleed film cooling slots/holes. This design permits the use of a thinner trailing edge and, therefore, has less trailing edge blockage and higher aerodynamic efficiency, but has lower cooling efficiency due to quick dissipation of the cooling film.

Thus, there is a need for a cooling design that can accept a thinner trailing edge of a turbine airfoil for better aerodynamic efficiency, yet still utilize the more effective convection cooling, rather than film cooling. In this manner, the environmental resistance and long-term stability of the thermal barrier coating system is improved and higher engine efficiencies can be obtained. The present invention fulfills this need, and further provides related advantages.

SUMMARY OF THE INVENTION

The present invention provides active convection cooling through micro channels within or adjacent to a bond coat layer applied to the trailing edge of a turbine engine high pressure airfoil. When placed adjacent to or within a porous TBC, the micro channels additionally provide transpiration cooling through the porous TBC. The micro channels communicate directly with at least one cooling circuit contained within the blade or vane from which they receive cooling air, thereby providing direct and efficient cooling for the bond coat layer. Because the substrate includes an actively cooled flow path surface region that can reduce the cooling requirement for the substrate, the engine can run at a higher firing temperature without the need for additional cooling air, achieving a better, more efficient engine performance.

In one embodiment, the present invention provides for an actively cooled flow path surface region of a gas turbine airfoil trailing edge comprising at least one trailing edge slot located within the airfoil substrate material, the slot having a first and second end. The first end terminates in a plenum located within the trailing edge, the second end communicates with a cooling fluid supply. At least one micro channel communicates with the plenum. The micro channel is located in a generally axial direction of the engine and parallel to the tip portion of the airfoil, along a surface of a first material applied over the substrate, such as a bond coat, and is substantially parallel to the surface of the substrate. A ceramic thermal barrier coating (TBC) overlies the first material and the micro channel.

In other preferred embodiments, the location of the micro channel may be, for example, at the substrate/bond coat interface, or it may be entirely within the TBC layer.

The present invention also sets forth a process for actively cooling the flow path surface region of a gas turbine engine airfoil trailing edge comprising the steps of casting an airfoil with pressure side bleed film cooling slots; adding a metallic bond coat to the airfoil; forming grooves in the bond coat such that the grooves are structured, with at least one structured micro groove communicating with at least one cooling fluid supply contained within the airfoil; applying, using a shadowing technique, a TBC layer over the structured grooves, resulting in the formation of hollow micro channels for the transport of a cooling fluid, and, passing a cooling fluid through the micro channels.

In other embodiments, the structured grooves, and therefore the resulting micro channels are located, for example, within the airfoil substrate at the substrate/bond coat interface, or they are placed entirely within the TBC layer.

The present invention further comprises the cooled flow path surface region formed by the foregoing processes and the turbine airfoil with the patterned micro channels substantially parallel to the surface of the substrate for cooling the component.

An advantage of the present invention is the flow path surface region of the coated gas turbine component is actively cooled. By removing heat from this region, the integrity of the bond coat can be maintained at higher engine operating temperatures.

In one embodiment, the active convection cooling through the micro channels occurs within or adjacent to the bond coat layer, providing direct and efficient cooling for the bond coat layer. Since the substrate is covered with the bond coat layer, the cooling requirement for the substrate will also be reduced.

Another advantage of the present invention is that the actively cooled bond coat layer will allow engine components to run at higher operating temperatures to achieve a better engine performance.

Still another advantage is that cooling air diffusing through the TBC will further lower the TBC temperature, thereby improving the TBC's thermal insulation efficiency on the pressure surface for the trailing edge bond coat and substrate.

The increased cooling efficiency provided by the cooling channel and coating arrangement allows for the design of thin trailing edges having high aerodynamic efficiency and durability at higher gas path temperatures.

Other features and advantages of the present invention will be apparent from the following more detailed description of the preferred embodiment, taken in conjunction with the accompanying figures which illustrate, by way of example, the principles of the invention.

DETAILED DESCRIPTION OF THE PREFERRED EMBODIMENTS

In addition to methods for actively cooling the flow path surface region of a coated gas turbine airfoil trailing edge, the present invention sets forth the process of producing active micro channels which can be used for cooling the airfoil trailing edge.

Different embodiments of the present invention vary in the location of the active cooling micro channels. Exemplar channel dimensions, orifice sizes, bond coat thickness and TBC thickness remain consistent among the various embodiments or can be varied and optimized for the various embodiments; therefore, in the interest of brevity and clarity, they will not be repeated. It is to be understood that these dimensions and sizes are only exemplar and will vary with the size of the substrate and the cooling requirements to allow active flow of cooling fluid.

Figure 1:
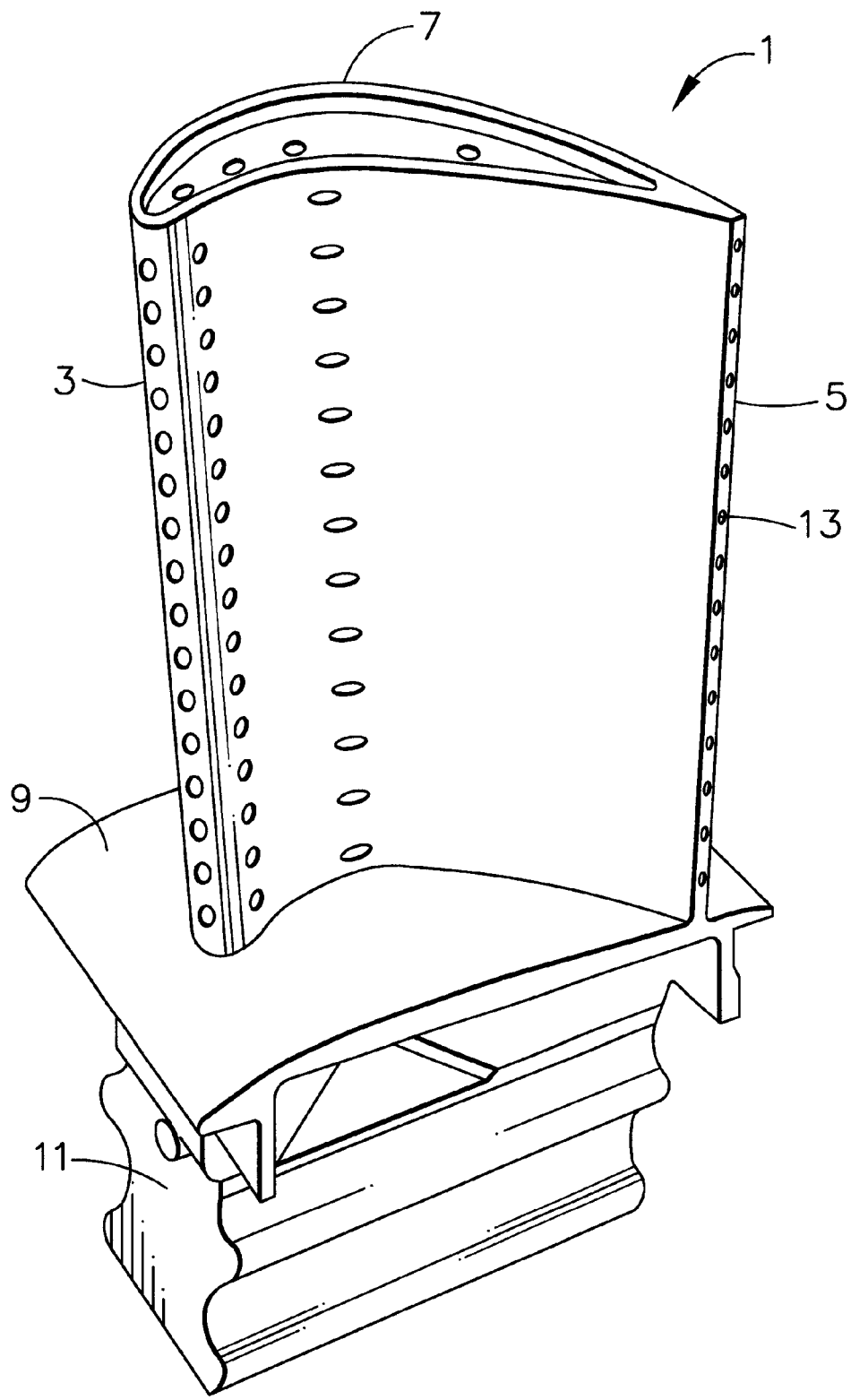
FIG. 1 is a perspective view of a turbine blade used in gas turbine applications.

FIG. 1 is a perspective view of a turbine airfoil 1 in which the major features of the blade, the leading edge 3, the trailing edge 5 the airfoil tip 7, the platform 9 and the blade dovetail 11 are depicted. Cooling holes 13 are shown emanating from the trailing edge 5 of blade 1. Additional cooling holes, such as along the leading edge 3 and the airfoil tip 7, may be present, but are not shown in FIG. 1.

Figure 2:
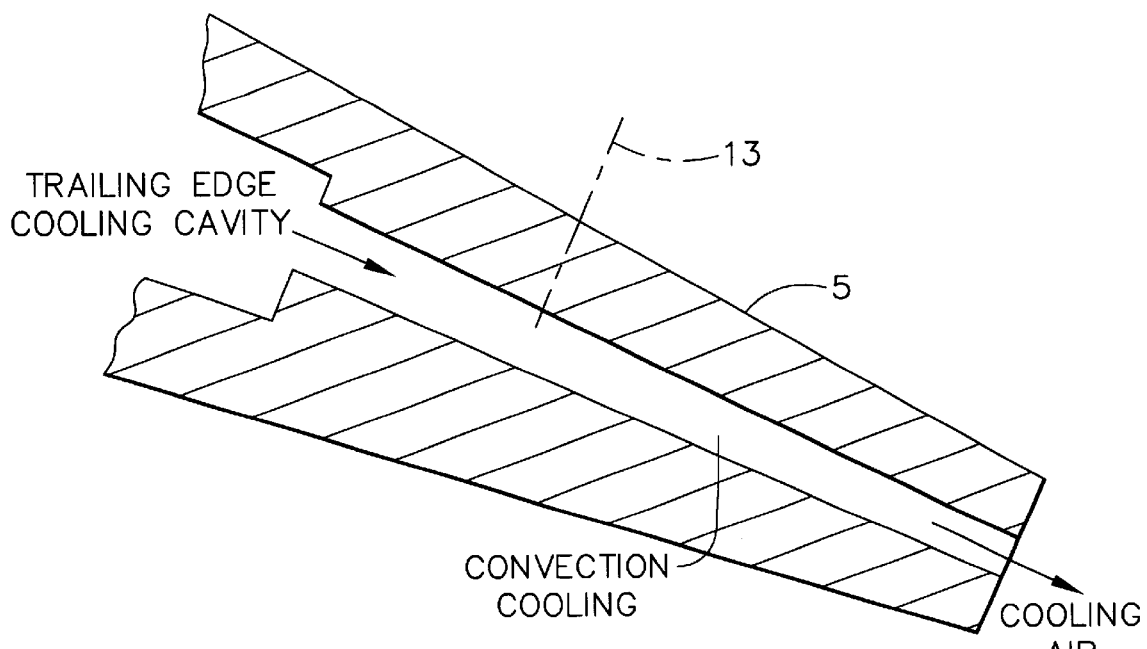
FIG. 2 is a representation of known art showing centerline convection cooling holes in a turbine airfoil trailing edge.
Figure 3:
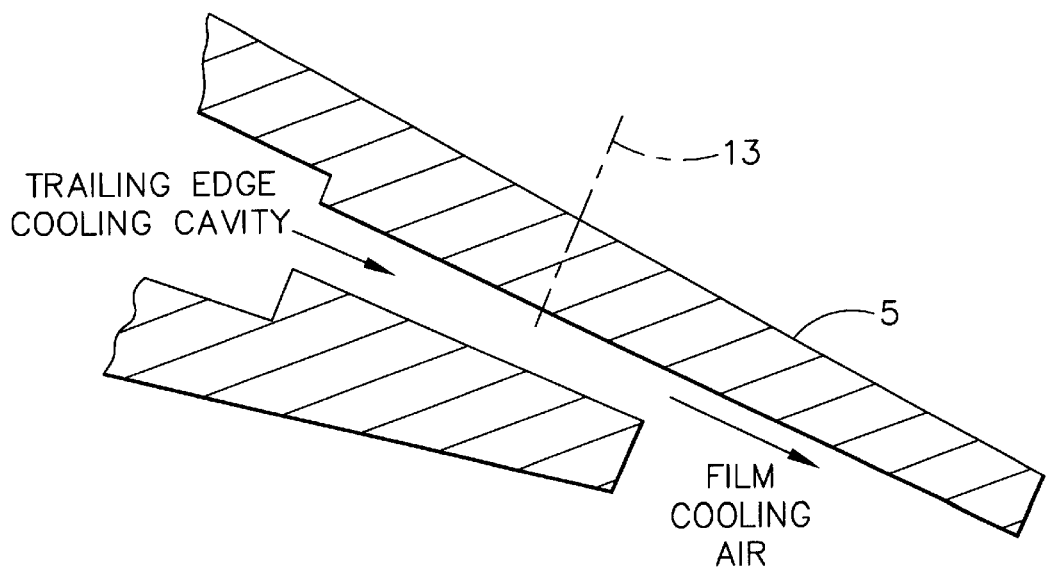
FIG. 3 is a representation of known art showing pressure side bleed film cooling slots in a turbine airfoil trailing edge.

FIGS. 2 and 3 show known methods of cooling the trailing edge of a turbine airfoil. The centerline convection cooling hole design of FIG. 2 requires a thick trailing edge to contain the trailing edge cooling cavity, while the pressure side bleed film cooling slots of FIG. 3 allow for inefficient quick dissipation of film cooling.

Figure 4:
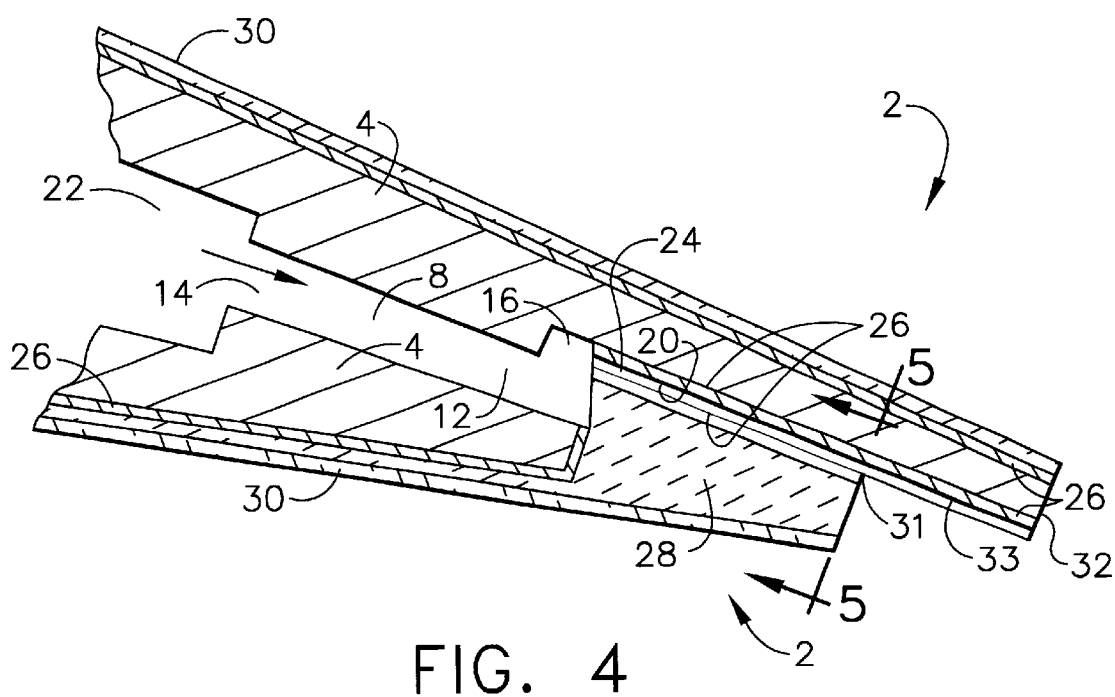
FIG. 4 is a representation of the turbine airfoil trailing edge having a thin profile and including the micro cooling channels of the present invention.

In accordance with a preferred embodiment of the invention, there is shown in FIG. 4 the substrate 4 of for example, a jet engine turbine airfoil trailing edge 2. The airfoil is cast in the conventional design with pressure side bleed film cooling slots 8 in order to have a thinner trailing edge 2. Substrate materials often used in turbine parts or airfoils for aircraft engines and power generation equipment may include nickel, cobalt, or iron based superalloys. The alloys may be cast or wrought superalloys. Examples of such substrates are GTD-111, GTD-222, René80, René41, René125, René77, René N4, René N5, René N6, $4^{th}$ generation single crystal superalloy—MX-4, Hastelloy X, and cobalt-based HS-188.

Contained within the substrate 4 is at least one channel, for example, a trailing edge slot 8 for the passage of cooling fluid (not shown). A first end 12 of trailing edge slot 8 communicates via a plenum 16, for example, a radial manifold, to a micro channel 20. A second end 14 of the trailing edge slot 8 connects to the cooling circuits 22 fabricated into the turbine engine component. The plenum 16 is in fluid communication with micro channel 20 through at least one orifice 24. Each orifice 24, in cross-section, may be larger than the size of the micro channel 20 to which it is connected and allows cooling fluid to flow into micro channel 20. The actual size depends on the cooling requirements of the article.

Figure 5:
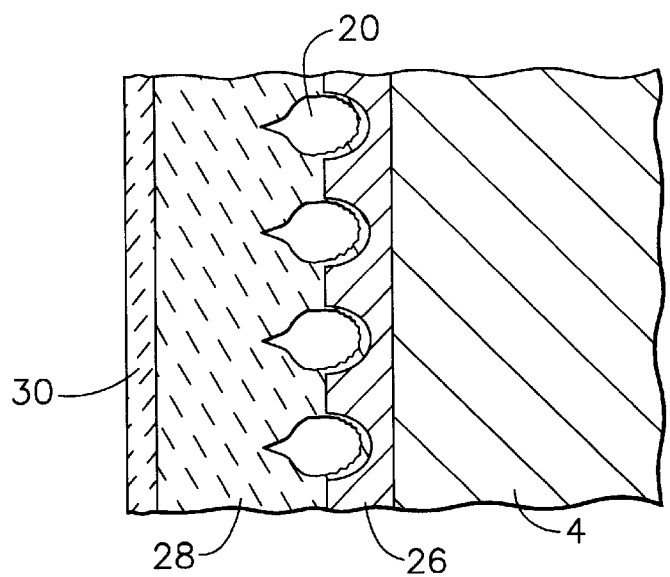
FIG. 5 is a representative view showing the cooling channels at 5—5 of FIG. 4; and, FIG. 6 is a representation of the turbine airfoil trailing edge having a tapered profile and including the micro cooling channels of the present invention.

Turning to FIG. 5, a bond coat 26 is applied using known techniques to a thickness of about 0.0005 inch to about 0.05 inch, preferably about 0.002 inch in thickness. Bond coat 26 thickness must be sufficient so that a structured micro groove (described below) is contained within bond coat 26. For example, bond coat 26 may be a diffusion aluminide, such as NiAl or PtAl base alloy applied to the appropriate thickness by for example, vapor phase aluminiding or chemical vapor deposition (CVD), or it may be a MCrAl(X) where M is an element selected from the group consisting of Fe, Co and Ni and combinations thereof and (X) is an element selected from the group of gamma prime formers, and solid solution strengtheners, consisting of, for example, Ta, Re or reactive elements, such as Y, Zr, Hf, Si, or grain boundary strengtheners consisting of B, and C, and combinations thereof. MCrAl(X) bond coats are applied to the substrate by physical vapor deposition (PVD) processes such as electron beam evaporation (EB), ion-plasma arc evaporation, sputtering, or thermal spray processes such as air plasma spray (APS), high velocity oxy-fuel (HVOF) or low pressure plasma spray (LPPS) and temperatures can be 1800° F. or higher. PVD processes are applied in a vacuum, while thermal sprays are controlled so as to be applied under non-oxidizing conditions.

After the bond coat 26 has been deposited, at least one structured micro groove is fabricated in a generally axial direction within the bond coat 26 on the downstream surface of the trailing edge slot 8, for example, by laser machining or Electro Chemical Machining (ECM), substantially parallel to the surface of the substrate 4. The groove size and spacing are about 0.0005 inch to about 0.010 inch, preferably about 0.002 inch. Optionally, at least one radial structured micro groove can be formed to intersect with the axial structured micro groove, so as to form a structured micro mesh. The cross section of the micro groove may assume any geometric form, for example, a rectangle, a circle, a triangle or any other shape that will facilitate the flow of cooling fluid. At least one structured micro groove is in communication with the plenum 16 through an exit orifice 24 in the trailing edge slot 8. A first TBC 28 is then applied over the bond coat 26 containing the structured grooves using known techniques, for example, electron beam physical vapor deposition (EB-PVD) process, to a thickness in the range of from about 0.001 inch to about 0.05 inch, preferably about 0.005 inch thickness.

As the first TBC 28 is deposited over the grooved surface of the bond coat, due to the shadowing effect of the TBC depositing on top of the peaks of the micro grooves, micro channels 20 are formed above the grooves, as shown in FIG. 5, as the TBC bridges the grooves. The shadowing effect may be best visualized by placing an object in front of a light source and observing the shadow cast by that object. Light rays passing around the object would represent TBC being deposited, while the shadow cast by the object would represent the void in the deposited first TBC 28. It is this void which ultimately forms the structured micro channel 20.

In the embodiment shown in FIG. 4, bond coat 26 is applied to the trailing edge 2 over the superalloy substrate 4. Structured micro grooves are fabricated in bond coat 26 but ends at a preselected distance 31 inboard of trailing edge base 32. The portion 33 of the trailing edge at a preselected distance 31 inboard of trailing edge base 32 and trailing edge base 32 does not include a structured microgroove. However, in the embodiment shown in FIG. 4, portion 33 is depicted as being coated with bond coat 26. However, if desired, portion 33 may be masked so that no bond coat is deposited on portion 33. Deposition of porous TBC layer 28 over the bond coat that includes structured micro grooves produces micro channels 20, which micro channels 20 have an exit orifice at preselected distance 31 inboard of trailing edge base 32 as shown in FIG. 4. In order to achieve the configuration shown in FIG. 4, it may be necessary to mask portion 33 to prevent the build-up of porous TBC layer 28 in portion 33, particularly if a bond coat has been deposited in portion 33. This build-up is undesirable as it could block the exit orifice and result in a thicker trailing edge than is otherwise achievable.

The configuration depicted in FIG. 4 can also be achieved by applying bond coat 26 over trailing edge, including portion 33 as described above. Micro grooves that extend to trailing edge base 32 can be fabricated into portion 33, but portion 33 must be masked prior to application of porous TBC layer 28. However formed, dense TBC 30 may be applied over porous TBC 28, and similar precautions to prevent the deposition of dense TBC over portion 33 must also be taken.

Figure 6:
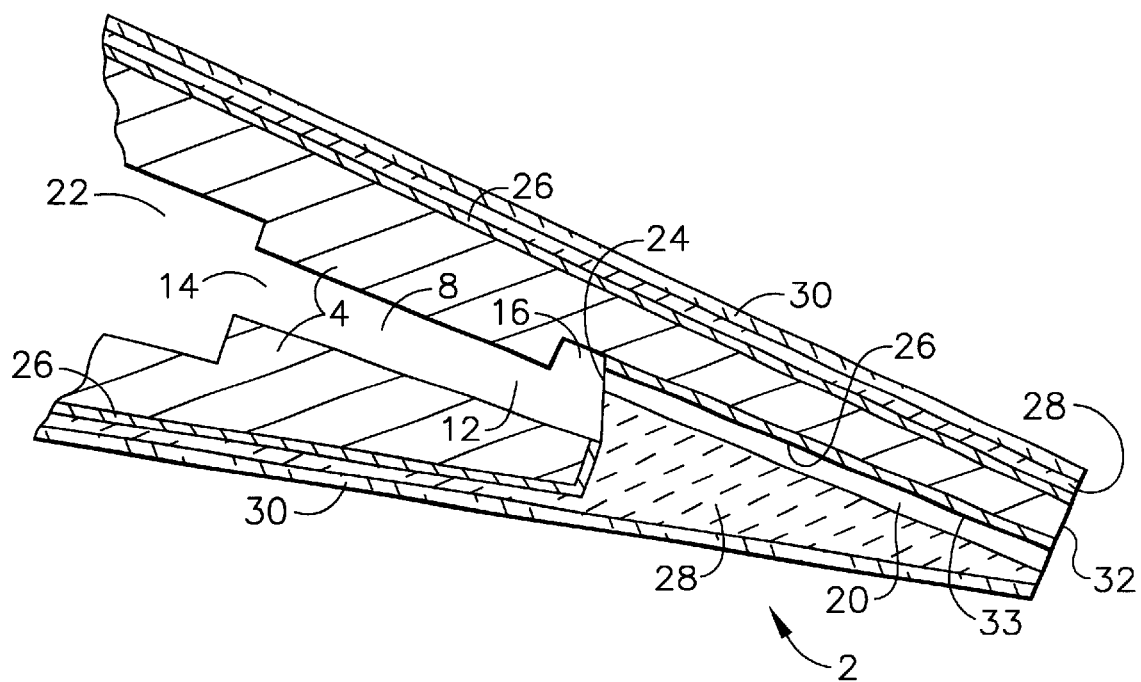

In another embodiment, depicted in FIG. 6, a tapered TBC layer is formed along the trailing edge. This configuration provides a somewhat thicker trailing edge than the previous embodiment, but provides thermal protection to that portion of the substrate in portion 33 that is otherwise exposed. Micro grooves are fabricated and extended to the trailing edge base 32 including portion 33 of the previous example after application of a bond coat over the trailing edge. Porous TBC 28 is applied over micro grooves forming micro channels 20. Because no masking is applied over bond coat 26, TBC 28 forms these micro channels in the trailing edge extending to trailing edge base 32 and is applied to taper from a thicker TBC to a thinner TBC in the vicinity of trailing edge base 32. The exit orifice for the micro channel in this configuration is now at or very near trailing edge base, and not inboard of trailing edge base as depicted in FIG. 4. An optional dense TBC 30 may be applied over the bond coat and/or the porous TBC 28.

The dimensions of the micro channel 20, in cross section, is about 0.001 to about 0.02 inch in diameter, when circular, but may be arcuate or may assume other geometric forms having equivalent dimensions, that is, yielding an equivalent cross-section size. The cross section of the micro channel may take any preselected form such as, for example, a parallelogram, rectangle, an oval, a triangle or a circle.

The first TBC layer 28 is generally a porous ceramic TBC layer and is the subject of a co-pending application assigned to the assignee of the present invention, which is identified as Ser. No. 09/707,027 and titled "Integrated Cooling in Thermal Barrier Coating," U.S. patent application Ser. No. 09/707,027 filed Nov. 6, 2000, now U.S. Pat. No. 6,375,425 issued Apr. 23, 2002. The first TBC layer 28 is thick enough to entirely fill the exit of the cast trailing edge slot 8. Since the first TBC 28 is porous, some of the cooling fluid will flow through the first TBC 28 to provide transpirational cooling of the TBC layer.

Optionally, a second, more dense outer layer 30 of TBC may be added to the first TBC layer 28 to further direct the flow of cooling fluid as described in a copending application identified as Ser. No. 09/707,024 entitled "Multi-layer Thermal Barrier Coating with Integrated Cooling System," now U.S. application Ser. No. 09/707,024 filed Nov. 6, 2000, in which the TBC is processed to have a varying density, and hence variable porosity. In this manner, cooling fluid is allowed to flow through the micro channel 20 and further spread through the inner TBC layer 28, providing cooling before exiting at the trailing edge base 32 and/or through the outer layer 30 of TBC.

Cooling fluid, for example, air, is thereby routed from an engine cooling fluid supply through the trailing edge slot 8 to the plenum 16 and into at least one micro channel 20. After passage through the micro channel 20, the cooling fluid which is at an elevated temperature, is expelled at the trailing edge base 32, typically into the gas stream. In this manner, the bond coat 26 is kept at a reduced temperature through active convection cooling.

In another embodiment of the present invention, the structured micro grooves are partially machined, for example, by a laser, by an ECM technique, cast during manufacture, or etched into the surface of the turbine airfoil substrate. A bond coat 26 is applied to the substrate 4 followed by TBC deposition as described above, to form the micro channel 20 at the interface between the bond coat 26 and the substrate 4. At least one micro groove is manufactured in communication with the plenum 16 so that the subsequently formed micro channel 20 can provide a passageway for cooling fluid, as described above.

In still another embodiment of the present invention, bond coat 26 and first layer of TBC 28 is applied to a relatively smooth substrate 4 using known techniques. If necessary, at least one hole is machined for example, using a laser, through the bond coat 26 and first layer of TBC 28 to communicate with the plenum 16, to allow for flow of cooling fluid as previously set forth. Using masking techniques as described in a co-pending application assigned to the assignee of the present invention, which is identified as Ser. No. 09/707,023 and titled "Directly Cooled Thermal Barrier Coating System," now U.S. application Ser. No. 09/707,023 filed Nov. 6, 2002, or a wire mesh shadowing techniques as described in a co-pending application assigned to the assignee of the present invention, which is identified as Ser. No. 09/777,930 and titled "Process For Creating Structured Porosity In Thermal Barrier Coating", now U.S. application Ser. No. 09/777,430 filed Feb. 6, 2001, the location of the micro cooling channel may be placed at any preselected position within the first TBC layer 28.

In embodiments in which structured micro grooves are formed first, followed by application of bond coat 26 over substrate 4 that includes the structured micro grooves, orifice blockage, that is the filling in of the micro grooves, by the application of bond coat 26 should be minimal. Partial entry of bond coat 26 into the fabricated micro grooves is preferred, as ceramic TBC adherence is increased. Application of bond coat 26 onto the surfaces of the micro grooves formed in the substrate, also provides a protective environmental coating to these surfaces.

The present invention also comprises the actively cooled thermal barrier coating system formed by the above described process.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A cooling system for actively cooling a flow path surface region of a gas turbine airfoil trailing edge extending into a gas flow path comprising:

a substrate having a trailing edge first surface adjacent the gas flow path;

a bond coat applied to the trailing edge first surface;

at least one coating material overlying the bond coat, an outer portion of the coating material forming the gas flow path surface;

at least one channel in the substrate, the channel extending through the substrate between a first and second end, the first end of the substrate channel terminating in proximity to the trailing edge first surface of the substrate adjacent to the flow path surface, the second end of the substrate channel in fluid communication with a cooling fluid supply;

at least one micro channel formed by the shadowing of the at least one coating material to a structured micro groove positioned between the first surface of the substrate and the outer surface of the coating material in a generally axial direction, the micro channel extending substantially parallel to the first surface of the substrate for a predetermined length, the micro channel in fluid communication with the first end of the substrate channel; and, means for expelling cooling fluid from the micro channel.

2. The cooling system of claim 1 wherein the at least one channel is a trailing edge slot.

3. The cooling system of claim 1 wherein the at least one coating material includes a porous ceramic thermal barrier coating over the bond coat.

4. The cooling system of claim 3 wherein the at least one coating material further includes a second thermal barrier coating more dense than the porous thermal barrier coating applied over the porous thermal barrier coating.

5. The cooling system of claim 1 further including a plenum positioned between the first end of the substrate channel and the at least one micro channel, the plenum in fluid communication with the first end of the substrate channel and the micro channel.

6. The cooling system of claim 1 wherein the bond coat is selected from the group consisting essentially of a diffusion aluminide bond coat and an MCrAl(X) bond coat, where M is an element selected from the group consisting essentially of nickel, cobalt, iron and combinations thereof, and X is an element selected from the group consisting essentially of gamma prime formers, solid solution strengtheners, reactive elements, grain boundary strengtheners and combinations thereof.

7. The cooling system of claim 6 wherein X is an element selected from the group consisting of Zr, Hf, Y and rare earth elements.

8. The cooling system of claim 1 wherein the structured micro groove is positioned within the bond coat.

9. The cooling system of claim 1 wherein the structured microgroove is fabricated into the first surface of the substrate.

10. The cooling system of claim 1 wherein the structured micro groove is positioned within the at least one coating material.

11. The cooling system of claim 1 wherein the structured micro groove size and spacing are about 0.0005" to about 0.01".

12. The cooling system of claim 1 wherein the structured micro groove size and spacing are about 0.002".

13. The cooling system of claim 1 wherein the at least one micro channel extending substantially parallel to the first surface of the substrate extends substantially parallel in a mesh pattern.

14. A process for actively cooling the flow path surface region of a gas turbine engine airfoil trailing edge extending into a gas flow path comprising the steps of:

fabricating, in a generally axial direction, at least one structured micro groove in an outermost surface of the trailing edge, the micro groove extending substantially parallel to a first surface of a substrate for a predetermined length and positioned between the first surface of the substrate and the gas flow path, the micro groove in fluid communication with a first end of a substrate channel, a second end of the substrate channel in fluid communication with at least one cooling fluid supply;

applying at least one layer of material over the structured micro groove such that at least one micro channel is formed, the micro channel remaining in fluid communication with the at least one cooling fluid supply; and, transporting a cooling fluid through the micro channels such that the cooling fluid is expelled into the gas stream.

15. The process of claim 14 further including a step of applying a second layer of material over the at least one layer wherein the second layer is more dense than the at least one layer.

16. The process of claim 14 wherein the at least one layer of material is applied over the structured micro groove using a shadowing technique.

17. The process of claim 14 wherein the at least one channel is a trailing edge slot.

18. The process of claim 15 wherein the outermost surface of the trailing edge is a substrate of the airfoil, the at least one layer of material is a bond coat and the second layer of material is a porous thermal barrier coating (TBC).

19. The process of claim 18 further including a step of applying a third layer of a material over the porous TBC wherein the third layer is more dense than the porous TBC.

20. The process of claim 14 wherein the outermost surface of the trailing edge is a bond coat applied to a substrate and the at least one layer of material is a porous TBC.

21. The process of claim 20 further including a step of applying a second layer of a material over the porous TBC wherein the second layer is more dense than the porous TBC.

22. The process of claim 14 wherein the outermost surface of the trailing edge is a first porous TBC applied to a bond coat applied to a substrate and the at least one layer of material is a second porous TBC.

23. The process of claim 22 further including a step of applying a second layer of a material over the second porous TBC wherein the second layer is more dense than the second porous TBC.

24. The flow path surface region of a gas turbine engine airfoil trailing edge extending into the gas flow path produced by the process of claim 14.

* * * * *